US009034093B2

(12) United States Patent
Stark et al.

(10) Patent No.: US 9,034,093 B2
(45) Date of Patent: *May 19, 2015

(54) PROCESS FOR IMPROVING THE TRANSFER PROPERTIES OF BITUMEN

(75) Inventors: Joseph L. Stark, Richmond, TX (US); Timothy J. O'Brien, Sugar Land, TX (US); Thomas J. Falkler, Missouri City, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 1203 days.

This patent is subject to a terminal disclaimer.

(21) Appl. No.: 12/507,042

(22) Filed: Jul. 21, 2009

(65) Prior Publication Data

US 2010/0022688 A1 Jan. 28, 2010

Related U.S. Application Data

(60) Provisional application No. 61/083,045, filed on Jul. 23, 2008.

(51) Int. Cl.
| | |
|---|---|
| *C08L 95/00* | (2006.01) |
| *C09D 4/00* | (2006.01) |
| *C09D 101/00* | (2006.01) |
| *C09D 201/00* | (2006.01) |
| *C08L 61/06* | (2006.01) |
| *C10C 3/02* | (2006.01) |

(52) U.S. Cl.
CPC .............. *C08L 61/06* (2013.01); *C08L 95/00* (2013.01); *C08L 2555/30* (2013.01); *C08L 2555/60* (2013.01); *C08L 2555/80* (2013.01); *C10C 3/026* (2013.01)

(58) Field of Classification Search
CPC ................................ C09L 95/00; C10C 3/026
USPC ................................ 524/59; 106/273.1, 284.4
See application file for complete search history.

(56) References Cited

U.S. PATENT DOCUMENTS

| | | | | |
|---|---|---|---|---|
| 2,499,368 | A | * | 3/1950 | Keiser et al. ................... 516/183 |
| 3,895,172 | A | * | 7/1975 | Jones ............................. 428/489 |
| 4,360,608 | A | * | 11/1982 | Hijikata et al. ................ 523/450 |
| 4,499,215 | A | * | 2/1985 | Okada ........................... 523/450 |
| 4,743,304 | A | * | 5/1988 | Gilmore et al. ................ 106/671 |
| 5,021,498 | A | * | 6/1991 | Stephenson et al. .......... 524/484 |
| 5,241,003 | A | * | 8/1993 | Degonia et al. ............... 525/123 |
| 5,328,505 | A | | 7/1994 | Schilling |
| 5,707,946 | A | * | 1/1998 | Hiebert et al. ................. 508/585 |
| 5,721,296 | A | * | 2/1998 | Mizunuma et al. ............ 524/60 |
| 2002/0002320 | A1 | * | 1/2002 | Lauer et al. .................... 585/864 |
| 2002/0068776 | A1 | * | 6/2002 | Guo et al. ....................... 524/59 |
| 2002/0193644 | A1 | * | 12/2002 | Feustel et al. .................... 585/1 |
| 2003/0149139 | A1 | * | 8/2003 | Honma et al. .................. 524/59 |
| 2004/0019248 | A1 | * | 1/2004 | Stark et al. ..................... 585/865 |
| 2004/0050752 | A1 | * | 3/2004 | Leinweber et al. ...... 208/48 AA |
| 2006/0113218 | A1 | * | 6/2006 | Hart et al. ...................... 208/391 |
| 2006/0229391 | A1 | * | 10/2006 | Torii et al. ....................... 524/64 |
| 2007/0221539 | A1 | * | 9/2007 | Cohrs et al. ..................... 208/18 |
| 2008/0041276 | A1 | | 2/2008 | Riebesehl et al. |
| 2009/0215931 | A1 | * | 8/2009 | Reinke et al. .................. 524/69 |
| 2010/0056408 | A1 | * | 3/2010 | Asomaning et al. .......... 508/460 |
| 2010/0331459 | A1 | * | 12/2010 | MacOme et al. ............... 524/59 |

FOREIGN PATENT DOCUMENTS

| | | | |
|---|---|---|---|
| EP | 1767611 A2 | * | 3/2007 |
| JP | 57000158 | | 1/1982 |
| JP | 59223716 A | | 12/1984 |
| JP | 01240595 A | | 9/1989 |
| JP | 08231826 A | | 9/1996 |
| JP | 08333504 A | | 12/1996 |
| JP | 11140327 A | | 5/1999 |
| JP | 2001-502389 | | 2/2001 |
| JP | 2003267788 A | | 9/2003 |
| WO | WO 2007/002005 A1 | | 6/2007 |

* cited by examiner

*Primary Examiner* — Liam J Heincer
(74) *Attorney, Agent, or Firm* — Mossman Kumar & Tyler PC

(57) ABSTRACT

Additives may be used to lower the set up point for bitumen thereby allowing it to be transported from place to place more easily. Additives useful for lowering the set up point of bitumen include alkylphenol formaldehyde resins and oxyalkylated alkylphenol formaldehyde resins; amines and esters; solvents; and combinations thereof.

21 Claims, No Drawings

PROCESS FOR IMPROVING THE TRANSFER PROPERTIES OF BITUMEN

CROSS-REFERENCE TO RELATED APPLICATIONS

This application claims priority from U.S. Provisional Patent Application Ser. No. 61/083,045 filed Jul. 23, 2008.

BACKGROUND OF THE APPLICATION

1. Field of the Invention

This invention relates to manufacturing and using bitumen and asphalt. This invention particularly relates to transporting bitumen and asphalt.

2. Background of the Prior Art

Heavy hydrocarbons such as bitumen, kerogen, and tars are high molecular weight hydrocarbons frequently encountered in subterranean formations. These hydrocarbons range from thick viscous liquids to solids at ambient temperatures and are generally quite expensive to recover in useful form. Bitumen occurs naturally in tar sands in locations such as Alberta, Canada and in the Orinoco oil belt north of the Orinoco river in Venezuela. Kerogens are the precursors to fossil fuels, and are also the material that forms oil shales. Kerogens, believed to be the precursor to bitumens, are frequently found in sedimentary rock formations.

Heavy hydrocarbons in general, have been used in a number of applications such as in asphalt and tar compositions for paving roads and roofing applications and as an ingredient in waterproofing formulations. Importantly, they are a potentially valuable feedstock for generating lighter hydrocarbons.

SUMMARY OF THE INVENTION

In one aspect, the invention is a process for modifying bitumen including admixing unmodified bitumen with an additive to produce a modified bitumen wherein the modified bitumen has a set up point that is at least 2° C. lower than the unmodified bitumen.

In another aspect, the invention is a composition of a modified bitumen prepared by admixing unmodified bitumen with an additive to produce a modified bitumen wherein the modified bitumen has a set up point that is at least 2° C. lower than the unmodified bitumen.

DETAILED DESCRIPTION OF THE INVENTION

For the purposes of the present application, the term bitumen means not only bitumen, but also kerogens, tars and other high molecular weight hydrocarbons that are solid or highly viscous at ambient temperatures. For example, bitumen and coke are often the last stops for crude oil in a refinery process. Typically, bitumen and coke are the least valuable of the products produced from crude oil. Bitumen is also sometimes referred to as asphalt It follows then that it is often desirable to produce as many lower molecular weight hydrocarbon from crude oil as possible. One problem in doing so is that resid crude oil increases in viscosity as the resid crude oil is subject to more and more extractions of lower molecular weight hydrocarbons. If too much lower molecular weight hydrocarbons are removed from crude oil resid, then it may become a bitumen or coke at a point in the process where the process cannot further transport the bitumen or coke to a process point that is capable of handling solids and highly viscous hydrocarbons. When this occurs, then expensive and time consuming efforts may have to be employed. For example, it may be necessary to add back lower molecular weight hydrocarbons as a solvent or employ mechanical or hydraulic method of cleaning out the unit occluded with bitumen or coke.

Problems with transporting bitumen do not just occur during a refining process. Bitumen is used in applications where it is admixed with polymers to prepare roofing materials and paving materials. If bitumen is allowed to get too cool, typically near its set up point, it must be reheated or it has to be handled as a solid. This can be undesirable.

For example, in one application of bitumen, bitumen may be sprayed onto a surface using a truck especially equipped for this purpose. U.S. Pat. No. 3,662,953 to Wiens, which is fully incorporated herein by reference, discloses a tank truck with heater and spray bar that is equipped with valve manifolds and valves and a flush tank and external coupling connections and has a master control with valve actuating means which are preferably operated in desired bitumen circuit combinations by fluid pressure to perform a variety of operations other than merely spraying bitumen through the spray bar onto a highway. It is further disclosed that the manifold can be warmed to prevent the bitumen from congealing therein by pumping bitumen from the heated tank back to the heated tank without admitting any of such bitumen to the spray bar.

In one embodiment, an invention of the disclosure is a process for modifying bitumen comprising admixing unmodified bitumen with an additive wherein the modified bitumen has a set up point that is at least 2° C. lower than the unmodified bitumen. Additives useful with this application include but are not limited to alkylphenol formaldehyde resins and oxyalkylated alkylphenol formaldehyde resins.

] Alkylphenol-formaldehyde resins are typically prepared by the acid or base catalyzed condensation of an alkylphenol with formaldehyde. Alkyl groups are straight or branched and contain about 3 to about 18, preferably about 4 to about 12 carbon atoms. Representative acid catalysts include dodecylbenzenesulfonic acid (DDBSA), toluene sulfonic acid, boron trifluoride, oxalic acid, and the like. Representative base catalysts include potassium hydroxide, sodium methoxide, sodium hydroxide, and the like. In an embodiment, the alkylphenol-formaldehyde resins have a molecular weight (Mn) of about 1,000 to about 50,000. In another embodiment, the alkylphenol-formaldehyde resins have a molecular weight of about 1,000 to about 10,000.

Alkylphenol-formaldehyde resins may be oxyalkylated by contacting the alkylphenol-formaldehyde resins with an epoxide such as ethylene oxide in the presence of a basic catalyst. For example, such resins may be prepared using sodium hydroxide or potassium hydroxide. The molar ratio of epoxide to OH group on the resin may be from about 1 to about 50. In some embodiments, the molar ratio is from about 2 to about 8. In still other embodiments, the molar ratio is from about 3 to about 7. The alkylphenol formaldehyde resins and oxyalkylated alkylphenol formaldehyde resins may be prepared using any method known to be useful to those of ordinary skill in the art of preparing such resins.

The additives useful with some embodiments of the invention may include other organic compounds and organic solvents. Organic compounds useful with some embodiments of the additives include, but are not limited to amines and esters. For example, a method of the invention may be practiced using additives including triethyl tetra-amine, tributyl tetra-amine, ethylene diamine, tetraethyl penta-amine, ethyl acetate, propyl acetate, ethyl butyrate, and the like and combinations thereof.

The organic solvents useful with some embodiments of the invention may include but are not limited to: ethyl benzene, xylene, toluene, and the like. When a solvent is present in the additive, it may be present at a concentration of from about 5 w/v percent to about 95 w/v percent. In other embodiments, the solvent if present at all is present at a concentration of from about 10 to 90 percent. In still other embodiments, the solvent may be present at a concentration of from about 15 to about 85 percent.

The additives disclosed herein may be used in any amount useful in lowering the set up point of a modified bitumen at least 2 degrees centigrade (2° C.) as compared to the same but unmodified bitumen. Set up point determinations may be made using any method known to those of ordinary skill in testing bitumen. For example, one such method that may be used includes stirring bitumen with a stir rod and noting the temperature wherein the stir rod becomes fixed and cannot be moved. Instrumental methods employing differential scanning calorimeters, for example, may also be employed.

Some of the components of the additives of the disclosure may have boiling points or vapor pressures that would cause those components to vaporize and be wasted if heated too quickly or under conditions that would not favor incorporation of those components into the bitumen. It follows then that when the bitumen is to be heated to a point near or above the boiling point of the additive component, the bitumen and additive are to be admixed first and then gradually heated to allow all, or as much as possible, of the additive component to be incorporated into the bitumen.

Embodiments of the methods of the application may be employed in any application where bitumen is being transported or moved and it would be desirable to avoid having to reheat the bitumen. For example, in one embodiment, bitumen is being transported in a rail or tank car and the rail car or tank begins to cool as soon as it is loaded. An additive of the invention is employed to lower the set up point sufficiently to allow the rail car or tank car to arrive at its destination before it has cooled to the set up point of the subject bitumen, thereby allowing the rail car or tank car to be off loaded without reheating. In another application, an additive of the invention is employed within a refinery to allow a bitumen that, unmodified, would be too viscous to move through a unit to be moved without the use of solvents or manual washouts. In still another embodiment, the additive is used to reduce the amount of energy necessary to pump a bitumen.

EXAMPLES

The following examples are provided to illustrate the present invention. The examples are not intended to limit the scope of the present invention and they should not be so interpreted. Amounts are in w/v parts or w/v percentages unless otherwise indicated.

Additive Sample Preparation

Three additives are prepared:

Additive "A" is prepared using 15 weight parts of ethyl benzene and 85 weight parts of an ethoxylated nonylphenol formaldehyde resin having a molecular weight of from about 5 to about 7 thousand and molar ratio of ethylene oxide to resin hydroxyl group of about 6:1;

Additive "B" is prepared by admixing 5 weight parts of a nonylphenol formaldehyde resin having a molecular weight of from about 3 to about 5 thousand with 1 weight part of triethyl tetra-amine and 94 weight parts of toluene; and Additive "C" is prepared by admixing 5 weight parts of a nonylphenol formaldehyde resin having a molecular weight of from about 3 to about 5 thousand with 1 weight part of triethyl tetra-amine, 47 weight parts of ethyl acetate, and 47 weight parts of toluene.

Example 1

A 25 g sample of bitumen is heated in an oven to 400° F. and then sealed within a can with a known amount of Additive A. A control sample is run without the additive. The can is rolled to mix the bitumen and additive for 10 seconds For both samples, the can is opened and a temperature probe is inserted into the bitumen. The sample is allowed to cool at ambient conditions while being stirred using a stirring rod. As the sample is stirred, the temperature is noted at the point where the stirring rod becomes fixed and cannot be moved. This "set up" temperature for the sample with the additive and is compared to the set up temperature for the sample without the additive. The lowering of the set up point is reported as the percent decrease in the set up temperature for the sample as compared to the control. The results are reported below in the Table.

Example 2

Example 1 is substantially reproduced except that additive B is used.

Example 3

Example 1 is substantially reproduced except that additive C is used.

TABLE

| Additive Concentration (ppm) | Example 1 Additive A % Reduction in Set Up Point | Example 2 Additive B % Reduction in Set Up Point | Example 3 Additive C % Reduction in Set Up Point |
| --- | --- | --- | --- |
| 500 | 0 | 0 | 0 |
| 1000 | 3 | 2 | 2 |
| 1500 | 5 | 2 | 1 |
| 2000 | 5 | 3 | 3 |

What is claimed is:

1. A process for modifying bitumen comprising admixing unmodified bitumen with an additive to produce a modified bitumen wherein the modified bitumen has a set up point that is at least 2° C. lower than the unmodified bitumen.

2. The process of claim 1 wherein the additive is selected from the group consisting of alkylphenol formaldehyde resins, oxyalkylated alkylphenol formaldehyde resins and mixtures thereof.

3. The process of claim 2 wherein the additive is an alkylphenol formaldehyde resin.

4. The process of claim 3 wherein the alkylphenol formaldehyde resin has an alkyl group having from about 3 to about 18 carbons.

5. The process of claim 4 wherein the alkylphenol formaldehyde resin has an alkyl group having from about 4 to about 12 carbons.

6. The process of claim 2 wherein the alkylphenol formaldehyde resin is prepared using a catalyst selected from the group consisting of dodecylbenzenesulfonic acid (DDBSA), toluene sulfonic acid, boron trifluoride, oxalic acid, and combinations thereof.

7. The process of claim 2 wherein the alkylphenol formaldehyde resin is prepared using a catalyst selected from the group consisting of potassium hydroxide, sodium methoxide, sodium hydroxide, and combinations thereof.

8. The process of claim 2 wherein the alkylphenol formaldehyde resin has a molecular weight of from about 1,000 to about 50,000.

9. The process of claim 8 wherein the alkylphenol formaldehyde resin has a molecular weight of from about 1,000 to about 10,000.

10. The process of claim 1 wherein the additive is an oxyalkylated alkylphenol formaldehyde resin.

11. The process of claim 10 wherein the oxyalkylated alkylphenol formaldehyde resin is prepared by contacting the alkylphenol-formaldehyde resins with an epoxide in the presence of a basic catalyst.

12. The process of claim 11 wherein the epoxide is ethylene oxide.

13. The process of claim 11 wherein the basic catalyst is selected from the group sodium hydroxide, potassium hydroxide, and combinations thereof.

14. The process of claim 10 wherein the molar ratio of epoxide to OH group on the resin is from about 1 to about 50.

15. The process of claim 10 wherein the molar ratio of epoxide to OH group on the resin is from about 2 to about 8.

16. The process of claim 10 wherein the molar ratio of epoxide to OH group on the resin is from about 3 to about 7.

17. The process of claim 1 wherein the additive additionally comprises amines and/or esters.

18. The process of claim 17 wherein the amines and/or esters are selected from the group consisting of triethyl tetra-amine, tributyl tetra-amine, ethylene diamine, tetraethyl penta-amine, ethyl acetate, propyl acetate, ethyl butyrate, and mixtures thereof.

19. The process of claim 1 wherein the additive additionally comprises a solvent.

20. The additive of claim 19 wherein the solvent is selected from the group consisting of ethyl benzene, xylenes, toluene, and mixtures thereof.

21. A modified bitumen composition prepared by admixing unmodified bitumen with an additive to produce a modified bitumen wherein the modified bitumen has a set up point that is at least 2° C. lower than the unmodified bitumen.

* * * * *